US010469681B2

(12) United States Patent
Sheng et al.

(10) Patent No.: US 10,469,681 B2
(45) Date of Patent: Nov. 5, 2019

(54) TOUCH DISPLAY MODULE, OFFICE APPARATUS HAVING TOUCH DISPLAY MODULE AND RELATED METHOD

(71) Applicant: AVISION INC., Hsinchu (TW)

(72) Inventors: Shao-Lan Sheng, Hsinchu (TW); Ching-Ching Lin, Hsinchu County (TW); Chen-Chang Li, Miaoli County (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 16/033,219

(22) Filed: Jul. 12, 2018

(65) Prior Publication Data
US 2019/0075209 A1    Mar. 7, 2019

(30) Foreign Application Priority Data

Sep. 7, 2017    (TW) .............................. 106130646 A

(51) Int. Cl.
*H04N 1/04* (2006.01)
*H04N 1/00* (2006.01)

(52) U.S. Cl.
CPC ........... *H04N 1/00411* (2013.01); *H04N 1/04* (2013.01)

(58) Field of Classification Search
CPC ............................ H04N 1/00411; H04N 1/04
USPC ...................................................... 358/1.15
See application file for complete search history.

(56) References Cited

U.S. PATENT DOCUMENTS

| 8,922,850 | B2 | 12/2014 | Hiro |
| 2007/0019251 | A1 | 1/2007 | Liao |
| 2008/0094650 | A1 | 4/2008 | Suzuki |
| 2012/0268764 | A1 | 10/2012 | Sheng |
| 2013/0148176 | A1* | 6/2013 | Hiro .......................... H04N 1/04 358/498 |
| 2018/0270395 | A1* | 9/2018 | Yamamoto ............. H04N 1/603 |

FOREIGN PATENT DOCUMENTS

| CN | 102752469 A | 10/2012 |
| CN | 103167208 A | 6/2013 |
| CN | 207442983 U | 6/2018 |
| TW | 201242791 A1 | 11/2012 |
| TW | M521232 U | 5/2016 |
| TW | I535576 B | 6/2016 |
| TW | M548280 U | 9/2017 |

* cited by examiner

Primary Examiner — Saeid Ebrahimi Dehkordy
(74) Attorney, Agent, or Firm — Winston Hsu

(57) ABSTRACT

A touch display module is for controlling a printing module and a scanning module. The scanning module is for at least scanning a first side of a scanned object to generate a first image corresponding to the first side of the scanned object. The touch display module includes a touch display panel and a control unit. The touch display panel at least includes a first section for displaying a first pattern corresponding to the first image and generating a first touch signal. The control unit controls the first section to display the first pattern corresponding to the first image when the control unit receives the first image transmitted from the scanning module. The control unit controls the printing module to print the first image according to the first touch signal when the control unit receives the first touch signal transmitted from the first section.

27 Claims, 12 Drawing Sheets

TOUCH DISPLAY MODULE, OFFICE APPARATUS HAVING TOUCH DISPLAY MODULE AND RELATED METHOD

BACKGROUND OF THE DISCLOSURE

1. Field of the Disclosure

The present disclosure relates to a touch display module, an office apparatus having the touch display module and a related method, and more particularly, to a touch display module capable of allowing a user to copy at least one of a first side of a scanned object and a second side opposite to the first side of the scanned object, an office apparatus having the touch display module, and a related copying method.

2. Description of the Prior Art

Most office apparatuses are equipped with automatic document feeders to save scanning time when it is desired to copy a large number of documents. However, different automatic document feeders may have different internal configurations. Therefore, when it is required to copy one side of each sheet of a document, a user may get confused about which side of each sheet of the document should face upwardly or downwardly, which may cause a blank printing page or a wrong printing page. Furthermore, the user cannot be aware of the black printing page or the wrong printing page until the blank printing page is taken out after completion of copying operation of the whole document. Therefore, it wastes time as well as resource.

SUMMARY OF THE DISCLOSURE

Therefore, it is an objective of the present disclosure to provide a touch display module capable of allowing a user to copy at least one of a first side of a scanned object and a second side opposite to the first side of the scanned object, an office apparatus having the touch display module, and a related method for solving the aforementioned problems.

In order to achieve the aforementioned objective, the present disclosure discloses a touch display module for controlling a printing module and a scanning module of an office apparatus to copy at least one of a first side of a scanned object and a second side opposite to the first side of the scanned object. The scanning module is for scanning the first side of the scanned object to generate a first image corresponding to the first side of the scanned object. The touch display module includes a touch display panel and a control unit. The touch display panel is electrically connected to the scanning module. The touch display panel includes a first section for displaying a first pattern corresponding to the first image and generating a first touch signal. The control unit is electrically connected to the touch display panel, the printing module and the scanning module. The control unit controls the first section of the touch display panel to display the first pattern corresponding to the first image according to the first image transmitted from the scanning module, and the control unit further controls the printing module to print the first image according to the first touch signal when receiving the first touch signal transmitted from the first section.

According to an embodiment of the present disclosure, the first pattern and the first image have different resolutions.

According to an embodiment of the present disclosure, the touch display panel further includes a second section for generating a second touch signal. The control unit further controls the scanning module to scan the second side of the scanned object opposite to the first side of the scanned object to generate a second image corresponding to the second side of the scanned object, and the control unit further controls the printing module to print the second image according to the second touch signal when receiving the second touch signal transmitted from the second section.

According to an embodiment of the present disclosure, the touch display panel further includes a third section for displaying a third pattern and generating a third touch signal. The control unit further controls the scanning module to scan the second side of the scanned object opposite to the first side of the scanned object to generate a second image corresponding to the second side of the scanned object and controls the printing module to print the first image and the second image onto a front surface and a rear surface opposite to the front surface of a printing media respectively according to the third touch signal when receiving the third touch signal transmitted from the third section.

According to an embodiment of the present disclosure, the touch display module further includes a second section. The scanning module further scans the second side of the scanned object opposite to the first side of the scanned object to generate a second image corresponding to the second side of the scanned object when or after the scanning module scans the first side of the scanned object to generate the first image corresponding to the first side of the scanned object, and the control unit further controls the first section and the second section of the touch display panel to display the first pattern corresponding to the first image and the second pattern corresponding to the second image respectively according to the first image and the second image transmitted from the scanning module.

According to an embodiment of the present disclosure, the second section is for generating a second touch signal, and the control unit further controls the printing module to print the second image according to the second touch signal when receiving the second touch signal transmitted from the second section.

According to an embodiment of the present disclosure, the touch display panel further includes a third section for displaying a third pattern and generating a third touch signal, and the control unit further controls the printing module to print the first image and the second image onto a front surface and a rear surface opposite to the front surface of a printing media respectively according to the third touch signal when receiving the third touch signal transmitted from the third section.

According to an embodiment of the present disclosure, the first pattern and the first image have different resolutions, and the second pattern and the second image have different resolutions.

In order to achieve the aforementioned objective, the present disclosure further discloses an office apparatus for copying at least one of a first side and a second side opposite to the first side of a scanned object. The office apparatus includes a scanning module, a storage unit, a printing module and a touch display module. The scanning module includes a first scanning unit for scanning the first side of the scanned object to generate a first image corresponding to the first side of the scanned object. The storage unit is for storing the first image. The printing module is for printing the first image. The touch display module includes a touch display panel and a control unit. The touch display panel includes a first section for displaying a first pattern corresponding to the first image and generating a first touch signal. The control unit is electrically connected to the touch display panel, the scanning module, the storage unit and the printing module. The control unit controls the first section of the touch display panel to display the first pattern corresponding to the first image according to the first image transmitted from the scanning module, and the control unit further controls the printing module to print the first image according to the first touch signal when receiving the first touch signal transmitted from the first section.

According to an embodiment of the present disclosure, the first pattern and the first image have different resolutions.

According to an embodiment of the present disclosure, the touch display panel further includes a second section for generating a second touch signal. The control unit further controls the first scanning unit to scan the second side of the scanned object opposite to the first side of the scanned object to generate a second image corresponding to the second side of the scanned object, and the control unit further controls the printing module to print the second image according to the second touch signal when receiving the second touch signal transmitted from the second section.

According to an embodiment of the present disclosure, the touch display panel further includes a third section for displaying a third pattern and generating a third touch signal. The control unit further controls the first scanning unit to scan the second side of the scanned object opposite to the first side of the scanned object to generate a second image corresponding to the second side of the scanned object, and the control unit further controls the printing module to print the first image and the second image onto a front surface and a rear surface opposite to the front surface of a printing media respectively according to the third touch signal when receiving the third touch signal transmitted from the third section.

According to an embodiment of the present disclosure, the touch display module further includes a second section. The first scanning unit further scans the second side of the scanned object opposite to the first side of the scanned object to generate a second image corresponding to the second side of the scanned object after the first scanning unit scans the first side of the scanned object to generate the first image corresponding to the first side of the scanned object, and the control unit further controls the first section and the second section of the touch display panel to display the first pattern corresponding to the first image and the second pattern corresponding to the second image respectively according to the first image and the second image transmitted from the scanning module.

According to an embodiment of the present disclosure, the second section is for generating a second touch signal, and the control unit further controls the printing module to print the second image according to the second touch signal when receiving the second touch signal transmitted from the second section.

According to an embodiment of the present disclosure, the touch display panel further includes a third section for displaying a third pattern and generating a third touch signal, and the control unit further controls the printing module to print the first image and the second image onto a front surface and a rear surface opposite to the front surface of a printing media respectively according to the third touch signal when receiving the third touch signal transmitted from the third section.

According to an embodiment of the present disclosure, the first pattern and the first image have different resolutions, and the second pattern and the second image have different resolutions.

According to an embodiment of the present disclosure, the scanning module further includes a second scanning unit for scanning the second side of the scanned object opposite to the first side of the scanned object to generate a second image corresponding to the second side of the scanned object, and the storage unit is for storing the second image.

According to an embodiment of the present disclosure, the touch display module further includes a second section. The second scanning unit scans the second side of the scanned object to generate the second image corresponding to the second side of the scanned object when the first scanning unit scans the first side of the scanned object to generate the first image corresponding to the first side of the scanned object, and the control unit further controls the first section and the second section of the touch display panel to display the first pattern corresponding to the first image and the second pattern corresponding to the second image respectively according to the first image and the second image transmitted from the scanning module.

According to an embodiment of the present disclosure, the second section is for generating a second touch signal, and the control unit further controls the printing module to print the second image according to the second touch signal when receiving the second touch signal transmitted from the second section.

According to an embodiment of the present disclosure, the touch display panel further includes a third section for displaying a third pattern and generating a third touch signal, and the control unit further controls the printing module to print the first image and the second image onto a front surface and a rear surface opposite to the front surface of a printing media respectively according to the third touch signal when receiving the third touch signal transmitted from the third section.

In order to achieve the aforementioned objective, the present disclosure further discloses a method of copying at least one of a first side and a second side opposite to the first side of a scanned object. The method includes a scanning module scanning the first side of the scanned object to generate a first image; a control unit of a touch display module controlling a first section of a touch display panel of the touch display module to display a first pattern corresponding to the first image according to the first image transmitted from the scanning module; and the control unit controlling a printing module to print the first image according to a first touch signal when receiving the first touch signal transmitted from the first section.

According to an embodiment of the present disclosure, the method further includes the control unit further controlling the scanning module to scan the second side of the scanned object to generate a second image corresponding to the second side of the scanned object and controlling the printing module to print the second image according to a second touch signal when receiving the second touch signal transmitted from a second section of the touch display panel.

According to an embodiment of the present disclosure, the method further includes the control unit further controlling the scanning module to scan the second side of the scanned object to generate a second image corresponding to the second side of the scanned object and controlling the printing module to print the first image and the second image onto a front surface and a rear surface opposite to the front surface of a printing media respectively according to a third touch signal when receiving the third touch signal transmitted from a third section of the touch display panel.

According to an embodiment of the present disclosure, the method further includes the scanning module further scanning the second side of the scanned object to generate a second image corresponding to the second side of the scanned object when or after the scanning module scans the first side of the scanned object to generate the first image corresponding to the first side of the scanned object; and the control unit further controlling the first section and a second section of the touch display panel to display the first pattern corresponding to the first image and a second pattern corresponding to the second image respectively according to the first image and the second image transmitted from the scanning module.

According to an embodiment of the present disclosure, the method further includes the control unit further controlling the printing module to print the second image according to a second touch signal when receiving a second touch signal transmitted from the second section.

According to an embodiment of the present disclosure, the method further includes the control unit further controlling the printing module to print the first image and the second image onto a front surface and a rear surface opposite to the front surface of a printing media respectively according to a third touch signal when receiving the third touch signal transmitted from a third section.

In order to achieve the aforementioned objective, the present disclosure further discloses a method of copying a first scanned media and a second scanned media. The method includes a scanning module scanning a first side and a second side opposite to the first side of the first scanned media to generate a first image corresponding to the first side of the first scanned media and a second image corresponding to the second side of the first scanned media; the scanning module scanning a fourth side and a fifth side opposite to the fourth side of the second scanned media to generate a fourth image corresponding to the fourth side of the second scanned media and a fifth image corresponding to the fifth side of the second scanned media; a control unit of a touch display module controlling a first section, a second section and a third section of a touch display panel of the touch display module to display a first pattern corresponding to the first image, a second pattern corresponding to the second image and a third pattern respectively according to the first image and the second image transmitted from the scanning module; the control unit controlling a printing module to print the first image, the second image or both of the first image and the second image according to a first touch signal, a second touch signal or a third touch signal when receiving the first touch signal transmitted from the first section, the second touch signal transmitted from the second section or the third touch signal transmitted from the third section; the control unit controlling the first section, the second section and the third section to display a fourth pattern corresponding to the fourth image, a fifth pattern corresponding to the fifth image, and a sixth pattern respectively according to the fourth image and the fifth image after the control unit controls the printing module to print the first image, the second image or both of the first image and the second image; and the control unit controlling the printing module to print the fourth image, the fifth image or both of the fourth image and the fifth image according to a fourth touch signal, a fifth touch signal or a sixth touch signal when receiving the fourth touch signal transmitted from the first section, the fifth touch signal transmitted from the second section or the sixth touch signal transmitted from the third section.

In summary, the present disclosure utilizes the control unit for at least controlling the first section of the touch display panel to display the first pattern corresponding to the first image according to the first image transmitted from the scanning module, so that it allows the user to confirm which image is going to be printed by previewing the first pattern. Furthermore, the present disclosure further utilizes the control unit for controlling the printing module to execute corresponding printing operation when receiving the touch signal transmitted from the touch display panel, so that it allows the user to copy at least one of the first side of the scanned object and the second side opposite to the first side of the scanned object. Therefore, the present disclosure can effectively prevent a blank printing page or a wrong printing page during copying operation, which saves time and resource.

These and other objectives of the present disclosure will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. Accordingly, the drawings and descriptions will be regarded as illustrative in nature and not as restrictive.

Figure 1:
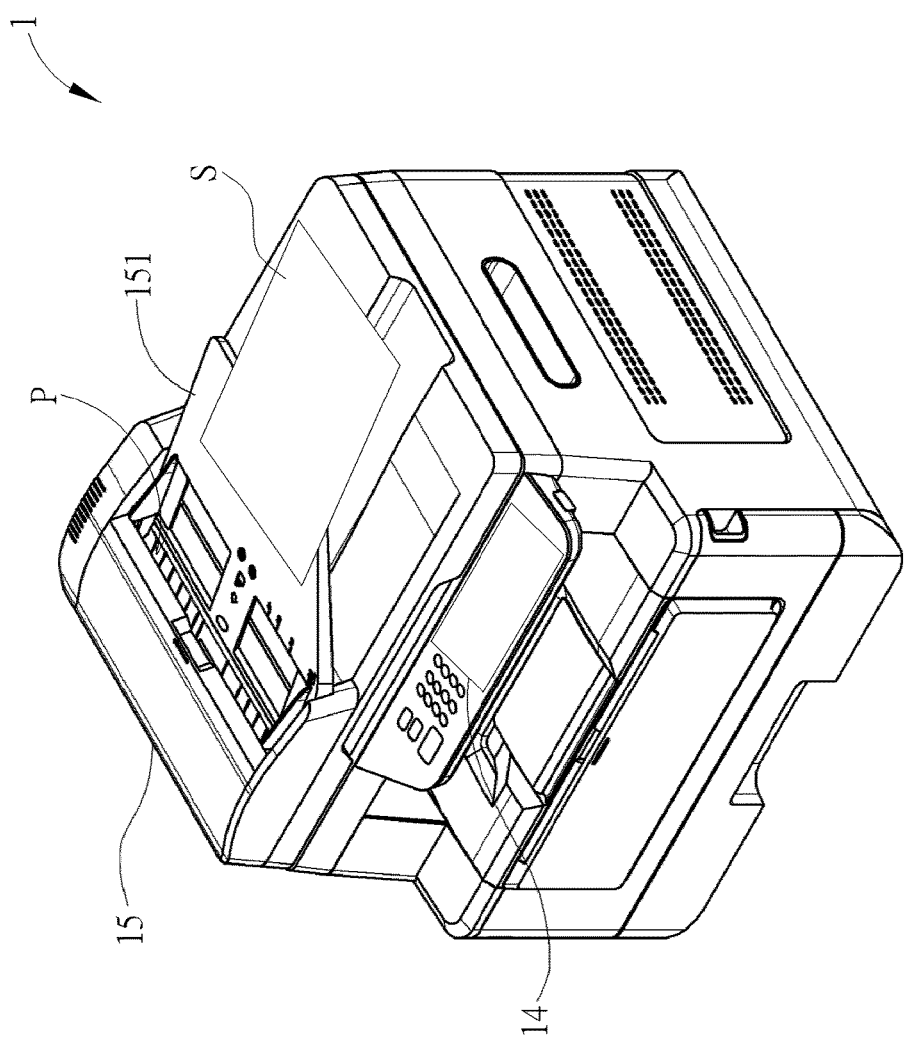
FIG. 1 is a schematic diagram of an office apparatus according to a first embodiment of the present disclosure.
Figure 2:
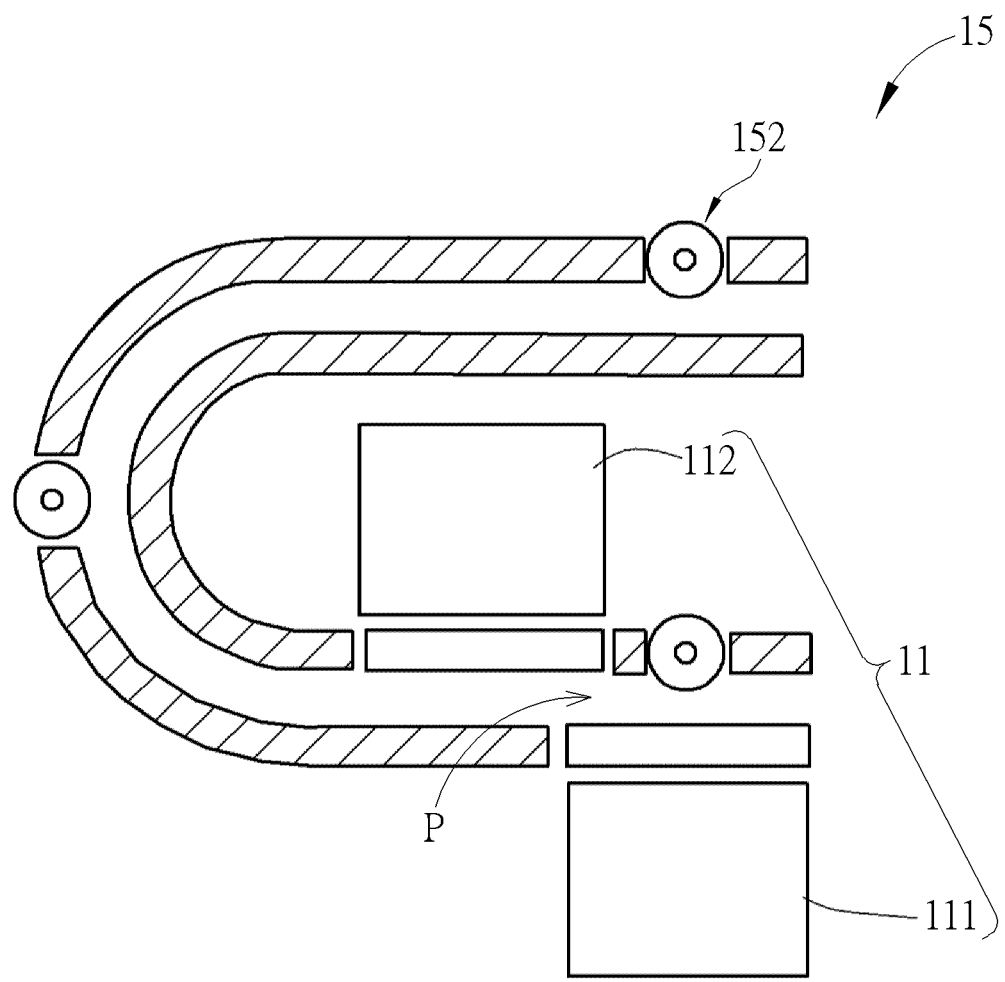
FIG. 2 is a partial internal structural diagram of the office apparatus according to the first embodiment of the present disclosure.
Figure 3:
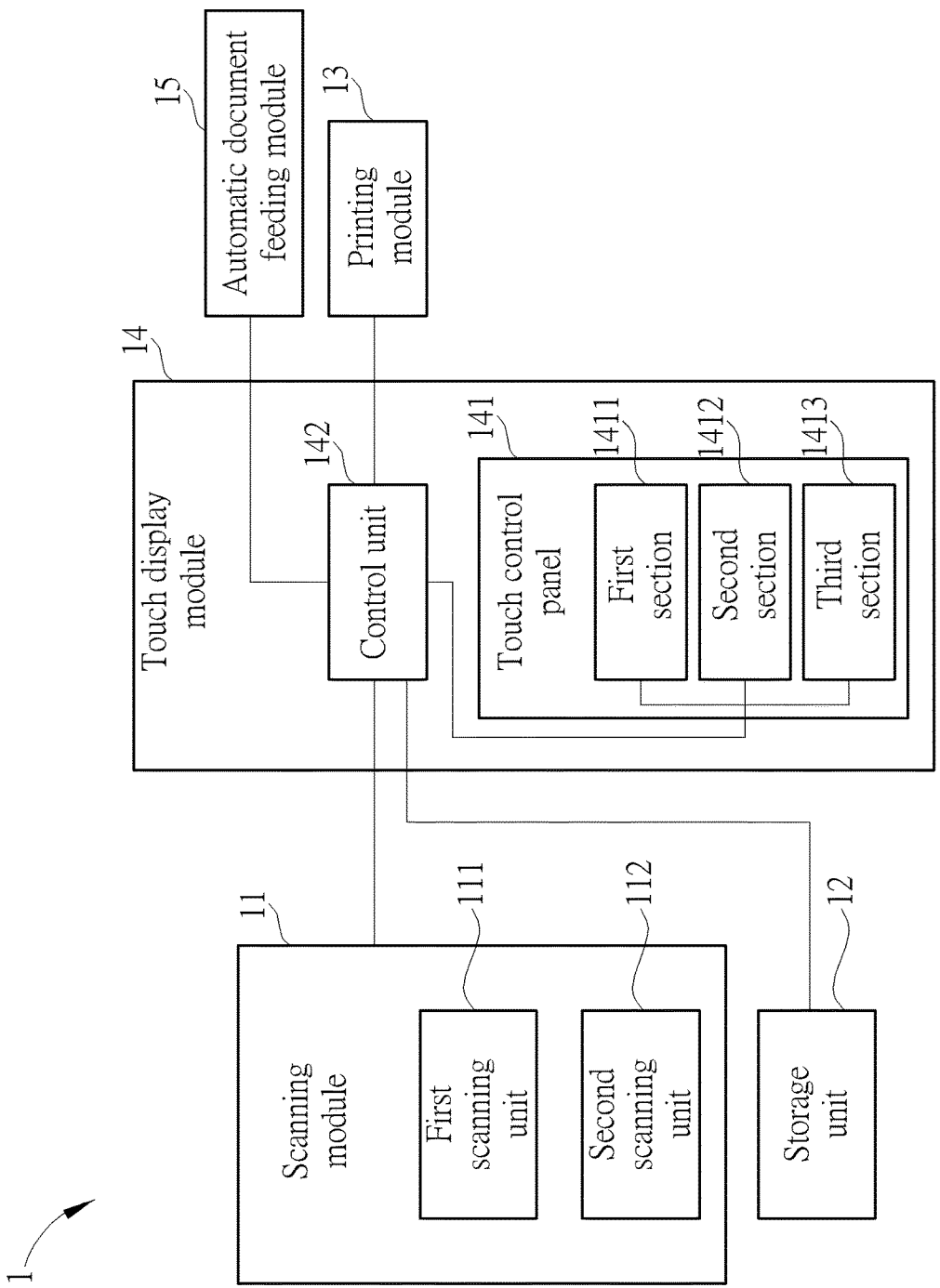
FIG. 3 is a functional block diagram of the office apparatus according to the first embodiment of the present disclosure.

Please refer to FIG. 1 to FIG. 3. FIG. 1 is a schematic diagram of an office apparatus 1 according to a first embodiment of the present disclosure. FIG. 2 is a partial internal structural diagram of the office apparatus 1 according to the first embodiment of the present disclosure. FIG. 3 is a functional block diagram of the office apparatus 1 according to the first embodiment of the present disclosure. As shown in FIG. 1 to FIG. 3, the office apparatus 1 includes a scanning module 11, a storage unit 12, a printing module 13, a touch display module 14 and an automatic document feeding module 15. In this embodiment, a feeding passage P is formed inside the automatic document feeding module 15, and the automatic document feeding module 15 includes a paper tray 151 for placing a scanned object S and a driving assembly 152 for driving the scanned object S to pass through the feeding passage P. The scanning module 11 includes a first scanning unit 111 and a second scanning unit 112. The first scanning unit 111 and the second scanning unit 112 are disposed on two opposite sides of the feeding passage P and for scanning a first side of the scanned object S and a second side opposite to the first side of the scanned object S to generate a first image corresponding to the first side and a second image corresponding to the second side respectively. The storage unit 12 is for storing the first image and the second image. The printing module 13 is for printing at least one of the first image and the second image.

Figure 4:
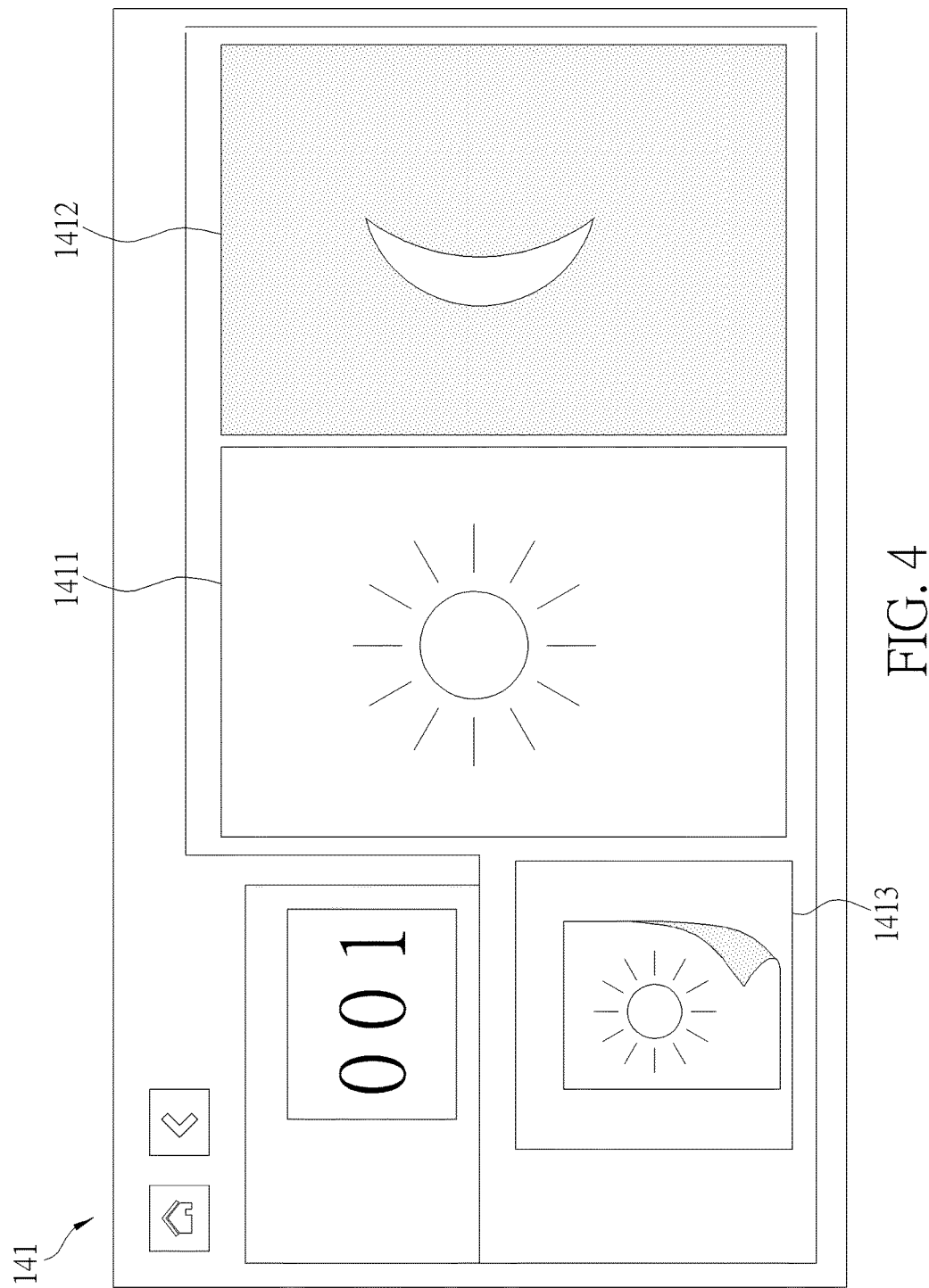
FIG. 4 is a diagram of a touch display panel according to the first embodiment of the present disclosure.
Figure 5:
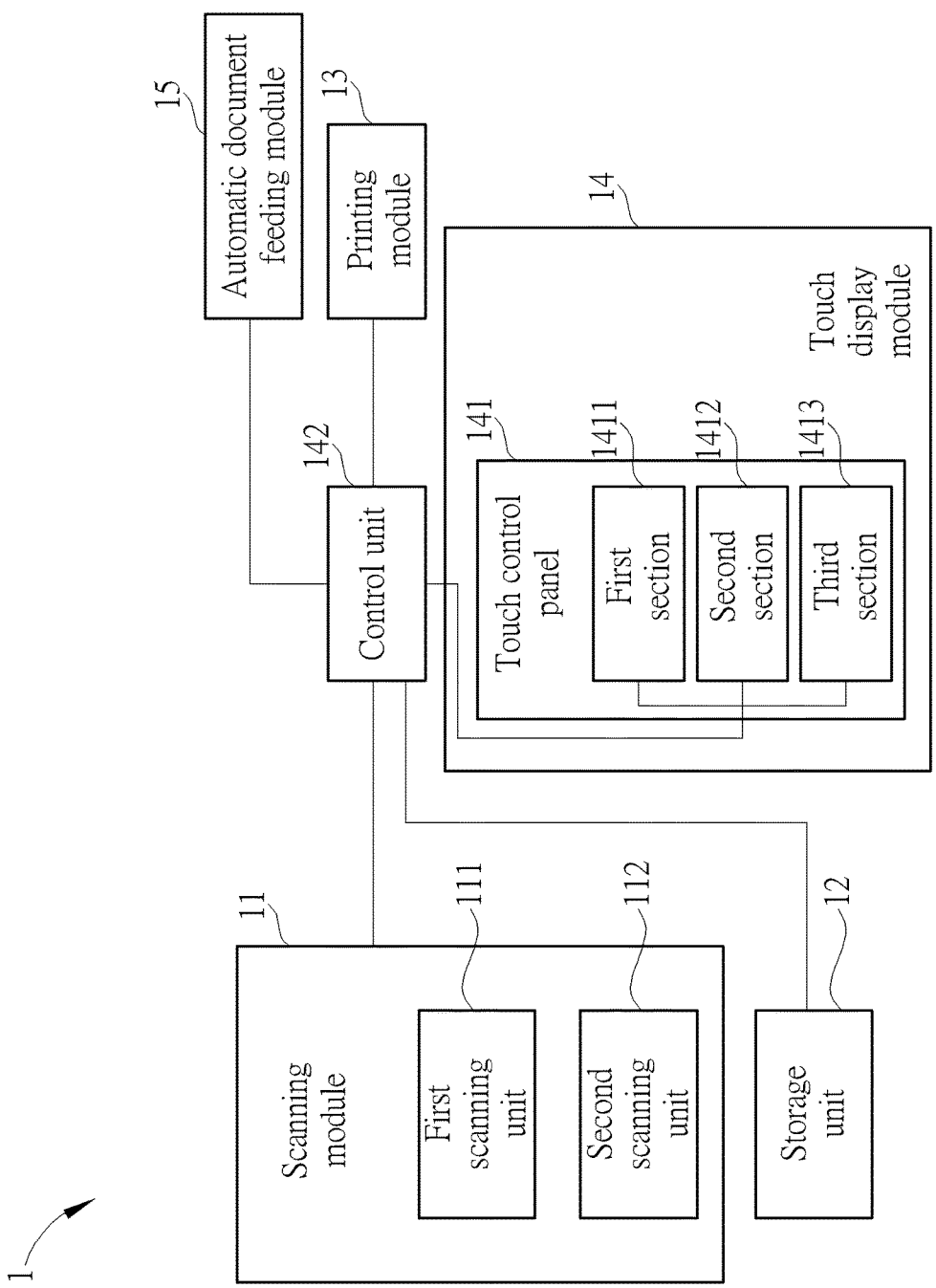
FIG. 5 is a functional block diagram of an office apparatus according to another embodiment of the present disclosure.

Please refer to FIG. 3 and FIG. 4. FIG. 4 is a diagram of a touch display panel 141 according to the first embodiment of the present disclosure. As shown in FIG. 3 and FIG. 4, the touch display module 14 includes the touch display panel 141 and a control unit 142. The touch display panel 141 at least includes a first section 1411, a second section 1412 and a third section 1413. The first section 1411 is for displaying a first pattern corresponding to the first image and generating a first touch signal when being actuated by touch operation. The second section 1412 is for displaying a second pattern corresponding to the second image and generating a second touch signal when being actuated by touch operation. The third section 1413 is for displaying a third pattern and generating a third touch signal when being actuated by touch operation. In this embodiment, as shown in FIG. 4, the first pattern and the second pattern can be thumbnails of the first image and the second image. That is, the first pattern and the first image have different resolutions, and the second pattern and the second image have different resolutions. The third pattern can be a double-sided printing icon synthesized from the first pattern and the second pattern. However, the first pattern, the second pattern and the third pattern are not limited to those illustrated in the figures of this embodiment. The control unit 142 is electrically connected to the touch display panel 141, the scanning module 11, the storage unit 12, the printing module 13 and the automatic document feeding module 15 for controlling operation of the aforementioned components. Furthermore, in this embodiment, the control unit 142 can be a microprocessor, a micro control unit, or a digital signal processor, and, as shown in FIG. 3, the control unit 142 can be disposed on a circuit board of the touch display module 14. However, it is not limited thereto. It depends on practical demands. For example, please refer to FIG. 5. FIG. 5 is a functional block diagram of the office apparatus 1 according to another embodiment of the present disclosure. As shown in FIG. 5, the control unit 142 of this embodiment can be disposed on a circuit board of the office apparatus 1 independently from the touch display module 14 and electrically connected to the touch display panel 141, the scanning module 11, the storage unit 12, the printing module 13 and the automatic document feeding module 15 for controlling the operation of the aforementioned components.

Figure 6:
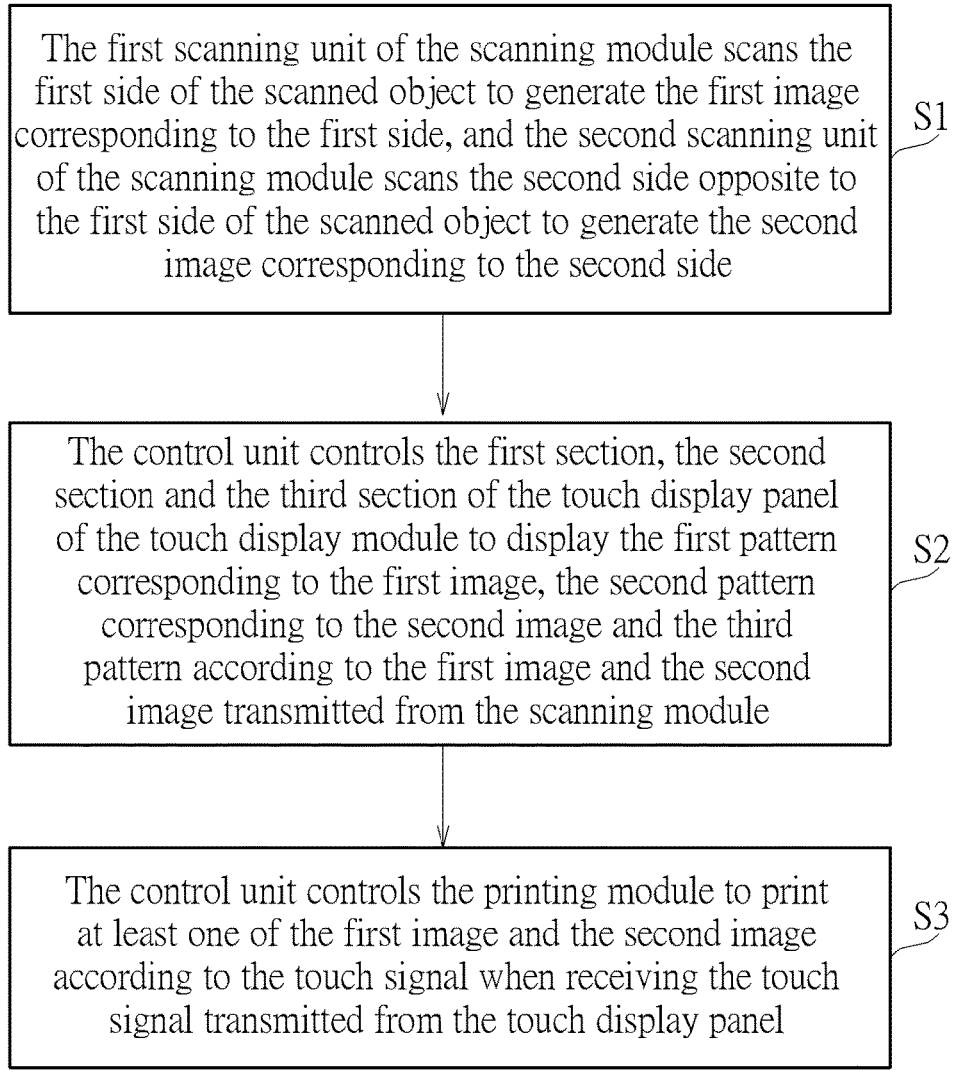
FIG. 6 is a flow chart diagram illustrating that the office apparatus executes a method of copying a scanned object according to the first embodiment of the present disclosure.

Please refer to FIG. 6. FIG. 6 is a flow chart diagram illustrating that the office apparatus 1 executes a method of copying the scanned object S according to the first embodiment of the present disclosure. As shown in FIG. 6, the method includes the following steps:

S1: The first scanning unit 111 of the scanning module 11 scans the first side of the scanned object S to generate the first image corresponding to the first side, and the second scanning unit 112 of the scanning module 11 scans the second side opposite to the first side of the scanned object S to generate the second image corresponding to the second side;

S2: The control unit 142 controls the first section 1411, the second section 1412 and the third section 1413 of the touch display panel 141 of the touch display module 14 to display the first pattern corresponding to the first image, the second pattern corresponding to the second image and the third pattern according to the first image and the second image transmitted from the scanning module 11; and S3: The control unit 142 controls the printing module 13 to print at least one of the first image and the second image according to the touch signal when receiving the touch signal transmitted from the touch display panel 141.

More detailed description for the steps of the method is provided as follows. As shown in FIG. 1 to FIG. 4 and FIG. 6, when it is desired to copy the scanned object S, the scanned object S can be placed on the paper tray 151 of the automatic document feeding module 15 firstly. When the driving assembly 152 of the automatic document feeding module 15 drives the scanned object S to pass through the feeding passage P, the first scanning unit 111 and the second scanning unit 112 of the scanning module 11 can scan the first side and the second side of the scanned object S at the same time to generate the first image corresponding to the first side of the scanned object S and the second image corresponding to the second side of the scanned object S respectively (step S1), so as to store the first image and the second image into the storage unit 12. As shown in FIG. 4, when the control unit 142 receives the first image and the second image transmitted from the scanning module 11, the control unit 142 can control the first section 1411, the second section 1412 and the third section 1413 of the touch display panel 141 to display the first pattern corresponding to the first image, the second pattern corresponding to the second image and the third pattern respectively at the same time (step S2). At this moment, since the first pattern and the second pattern can be thumbnails of the first image and the second image, it allows a user to preview a scanning result of the scanned object S on the touch display panel 141, so that the user can touch the first section 1411, the second section 1412 or the third section 1413 of the touch display panel 141 to generate the corresponding touch signal to print at least one of the first image and the second image according to practical demands (step S3).

For example, when it is desired to copy the first side of the scanned object S only, the first section 1411 can be touched to generate the first touch signal, so that the control unit 142 can control the printing module 13 to print the first image corresponding to the first side according to the first touch signal. Similarly, when it is desired to copy the second side of the scanned object S, the second section 1412 can be touched to generate the second touch signal, so that the control unit 142 can control the printing module 13 to print the second image corresponding to the second side according to the second touch signal. Furthermore, when it is desired to copy both of the first side and the second side of the scanned object S, the third section 1413 can be touched to generate the third touch signal, so that the control unit 142 can control the printing module 13 to print the first image and the second image onto the a front surface and a rear surface opposite to the front surface of the printing media respectively. In other words, in the present disclosure, after scanning the scanned object S, the user can confirm which image is going to be printed by previewing the scanning result of the scanned object S on the touch display panel 141, so that the user can touch the touch display panel 141 to generate the corresponding touch signal to execute corresponding printing operation. Therefore, it can effectively prevent a blank printing page or a wrong printing page.

Figure 7:
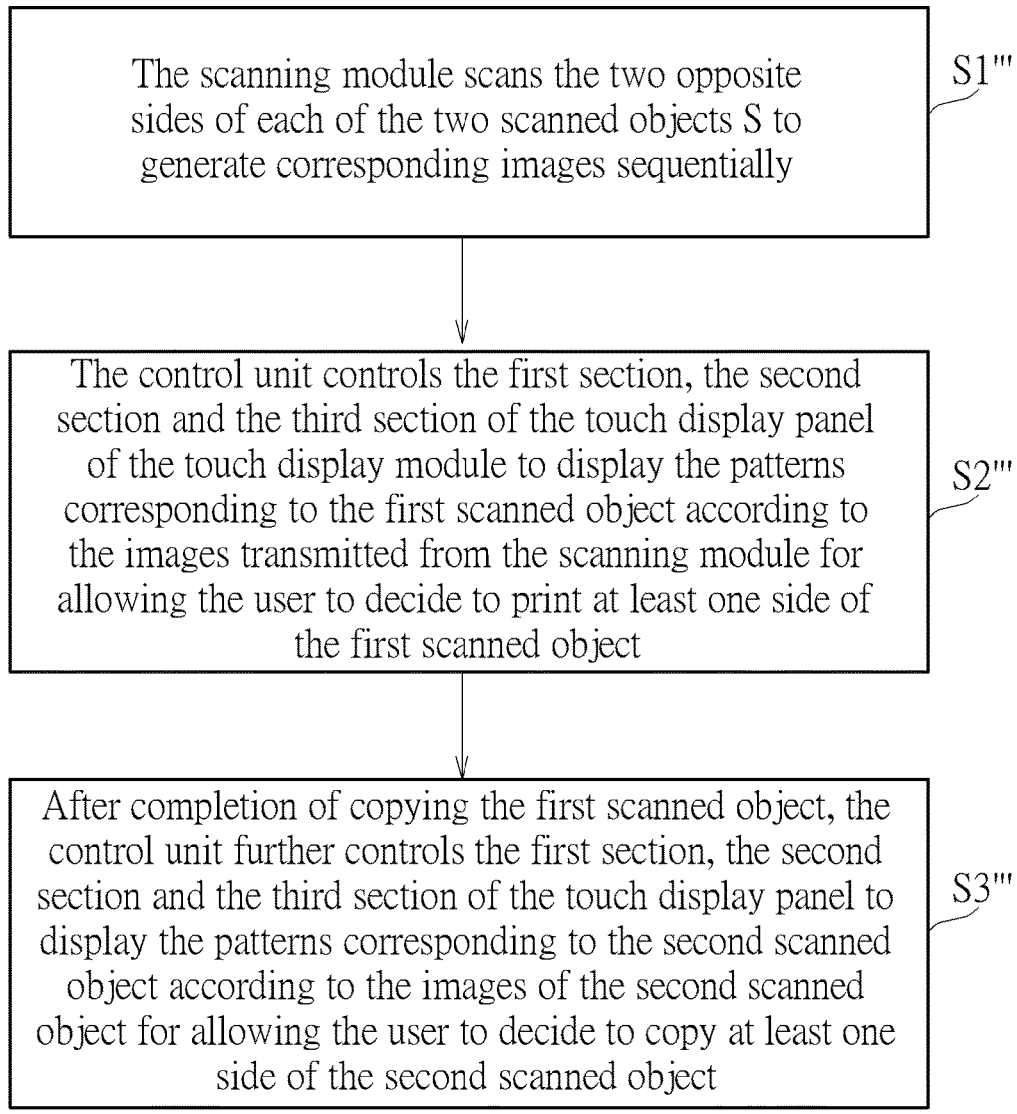
FIG. 7 is a flow chart diagram illustrating that an office apparatus executes a method of copying a scanned object according to another embodiment of the present disclosure.

Furthermore, when it is desired to continuously copy a plurality of scanned objects S, the control unit 142 can be configured to control the touch display play 141 to display the corresponding patterns corresponding to the first scanned object S for allowing the user to decide to print the first side, the second side or both of the first side and the second side of each scanned object before printing the corresponding image of the first scanned object S. Afterwards, the control unit 142 can follow the aforementioned configuration to print the corresponding images of the following scanned objects S. It is not required to confirm the images of the following scanned objects S one by one for saving copying time. However, the present disclosure is not limited thereto. The present disclosure also can be configured to allow the user to confirm the every images of the plurality of scanned objects S one by one. For example, please refer to FIG. 7. FIG. 7 is a flow chart diagram illustrating that the office apparatus 1 executes a method of copying the scanned object S according to another embodiment of the present disclosure. As shown in FIG. 7, when it is desired to continuously copy two scanned objects S, the scanning module 11 can scan two opposite sides of each of the two scanned objects S to generate corresponding images sequentially (step S1'''). The control unit 142 can control the first section 1411, the second section 1412 and the third section 1413 of the touch display panel 141 to display patterns corresponding to the first scanned object S according to the images of the first scanned object S transmitted from the scanning module 11 for allowing the user to decide to copy at least one side of the first scanned object S (step S2'''). After completion of copying the first scanned object S, the control unit 142 further controls the first section 1411, the second section 1412 and the third section 1413 of the touch display panel 141 to display patterns corresponding to the second scanned object S according to the images of the second scanned object S for allowing the user to decide to copy at least one side of the second scanned object S (step S3''').

Specifically, when the control unit 142 receives the images transmitted from the scanning module 11, the control unit 142 controls the first section 1411, the second section 1412 and the third section 1413 of the touch display panel 141 to respectively display the first pattern corresponding to the first image of the first side of the first scanned object S, the second pattern corresponding to the second image of the second side of the first scanned object S, and the third pattern. The control unit 142 can receive the first touch signal transmitted from the first section 1411, the second touch signal transmitted from the second section 1412, or the third touch signal transmitted from the third section 1413 and further control the printing module 13 to print the first image corresponding to the first side of the first scanned object S, the second image corresponding to the second side of the first scanned object S, or both of the first image and the second image corresponding to the first scanned object S according to the first touch signal, the second touch signal or the third touch signal. After the control unit 142 controls the printing module 13 to print the first image, the second image or both of the first image and the second image corresponding to the first scanned object S, the control unit 142 further controls the first section 1411, the second section 1412 and the third section 1413 of the touch display panel 141 to respectively display a fourth pattern corresponding to a fourth image of a fourth side of the second scanned object S, a fifth pattern corresponding to a fifth image of a fifth side of the second scanned object S and a sixth pattern. The control unit 142 can receive a fourth touch signal transmitted from the first section 1411, a fifth touch signal transmitted from the second section 1412, or a sixth touch signal transmitted from the third section 1413 and further control the printing module 13 to print the fourth image corresponding to the fourth side of the second scanned object S, the fifth image corresponding to the fifth side of the second scanned object S, or both of the fourth image and the fifth image corresponding to the second scanned object S according to the fourth touch signal, the fifth touch signal or the sixth touch signal. Furthermore, understandably, steps of operation of copying three or more scanned objects S are similar to the ones described above. Detailed description is omitted herein for simplicity.

Figure 8:
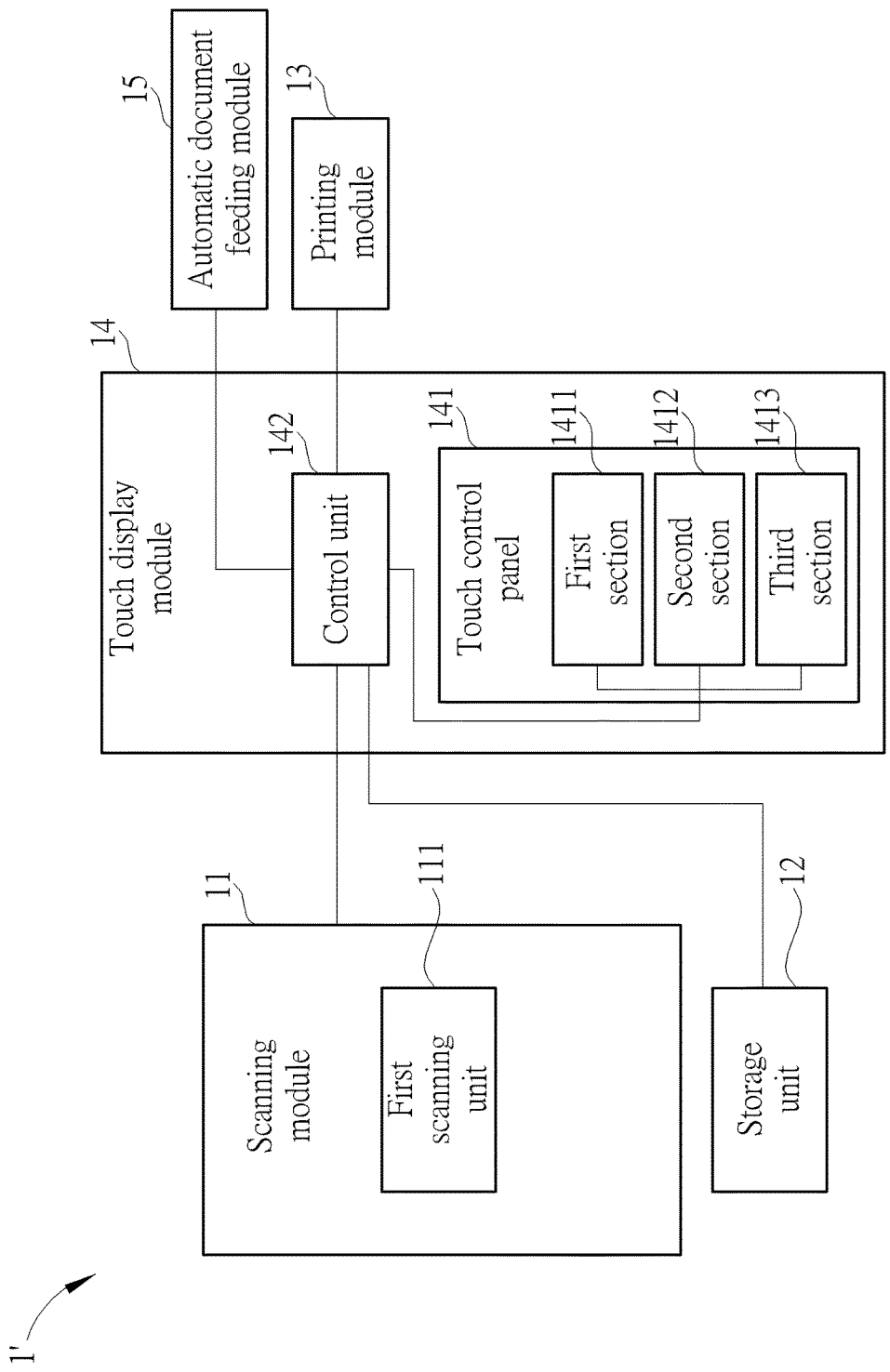
FIG. 8 is a functional block diagram of an office apparatus according to a second embodiment of the present disclosure.
Figure 9:
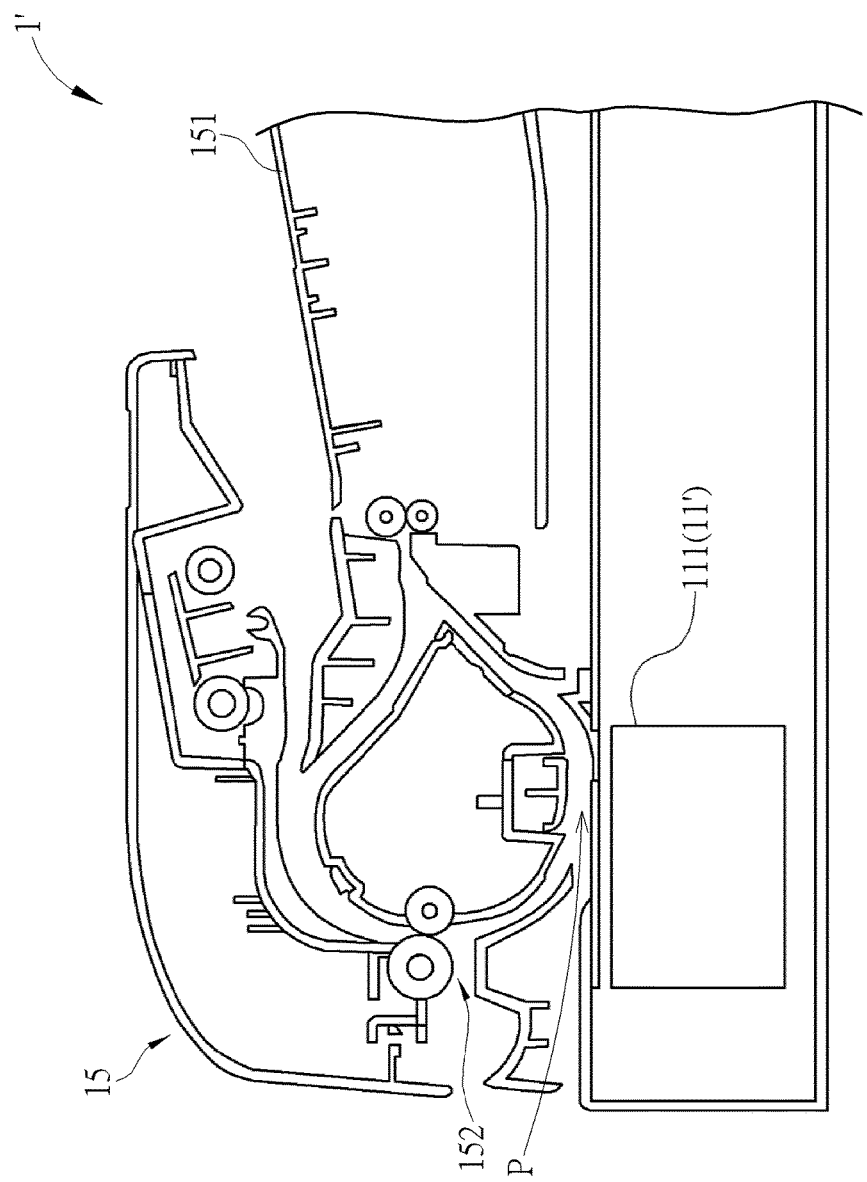
FIG. 9 is a partial internal structural diagram of the office apparatus according to the second embodiment of the present disclosure.
Figure 10:
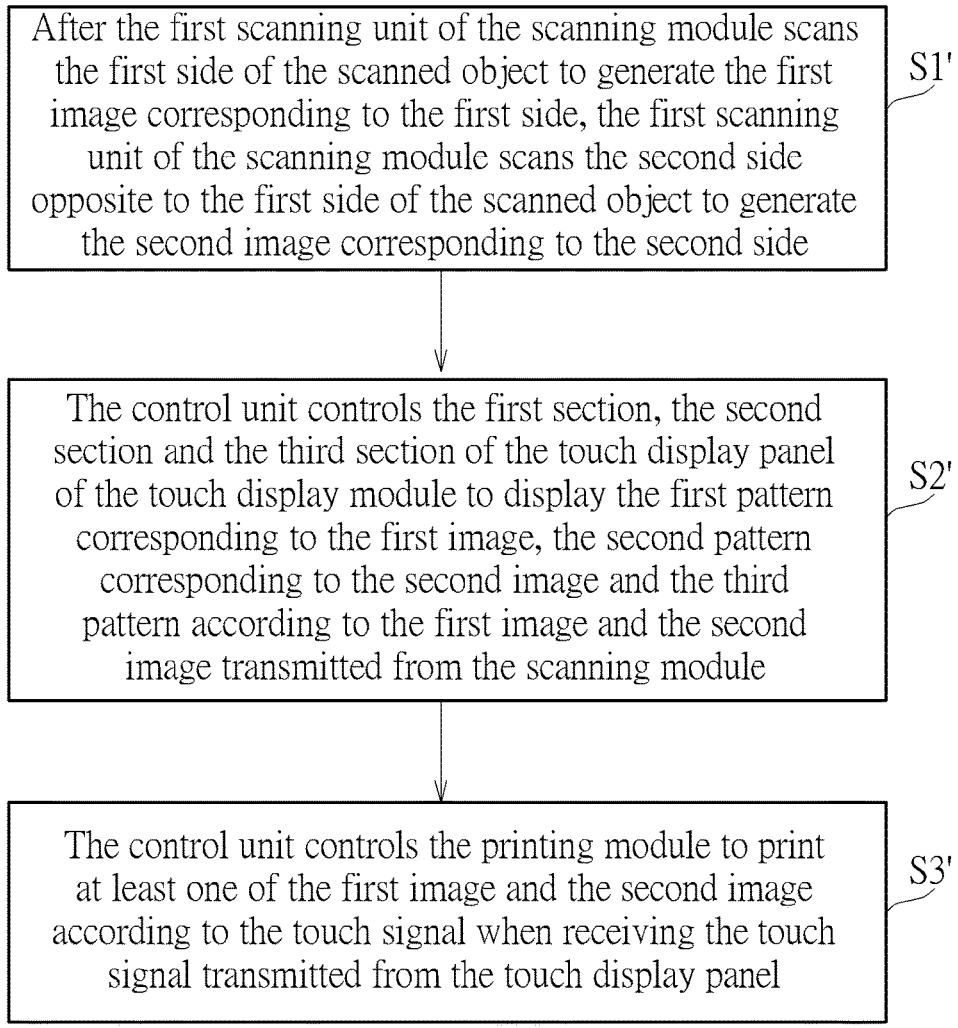
FIG. 10 is a flow chart diagram illustrating that the office apparatus executes a method of copying a scanned object according to the second embodiment of the present disclosure.

Please refer to FIG. 8 to FIG. 10. FIG. 8 is a functional block diagram of an office apparatus 1' according to a second embodiment of the present disclosure. FIG. 9 is a partial internal structural diagram of the office apparatus 1' according to the second embodiment of the present disclosure. FIG. 10 is a flow chart diagram illustrating that the office apparatus 1' executes a method of copying the scanned object S according to the second embodiment of the present disclosure. As shown in FIG. 8 to FIG. 10, different from the office apparatus 1 of the first embodiment, a scanning module 11' of the office apparatus 1' of this embodiment includes the first scanning unit 111 only but does not include the second scanning unit 112. The configurations of the feeding passage P and the driving assembly 152 of the automatic document feeding module 15 are shown in FIG. 9. Therefore, in this embodiment, the scanning module 11' cannot scan the first side and the second side of the scanned object S at the same time. In other words, when the scanned object S is driven to pass through the first scanning unit 111 for the first time, the first scanning unit 111 can scan the first side of the scanned object S to generate the first image corresponding to the first side. Afterwards, when the scanned object S is driven to pass through the first scanning unit 111 again, the first scanning unit 111 can scan the second side of the scanned object S to generate the second image corresponding to the second side (step S1'). Furthermore, steps S2', S3' of this embodiment are similar to steps S2, S3 of the first embodiment. Detailed description is omitted herein for simplicity.

Figure 11:
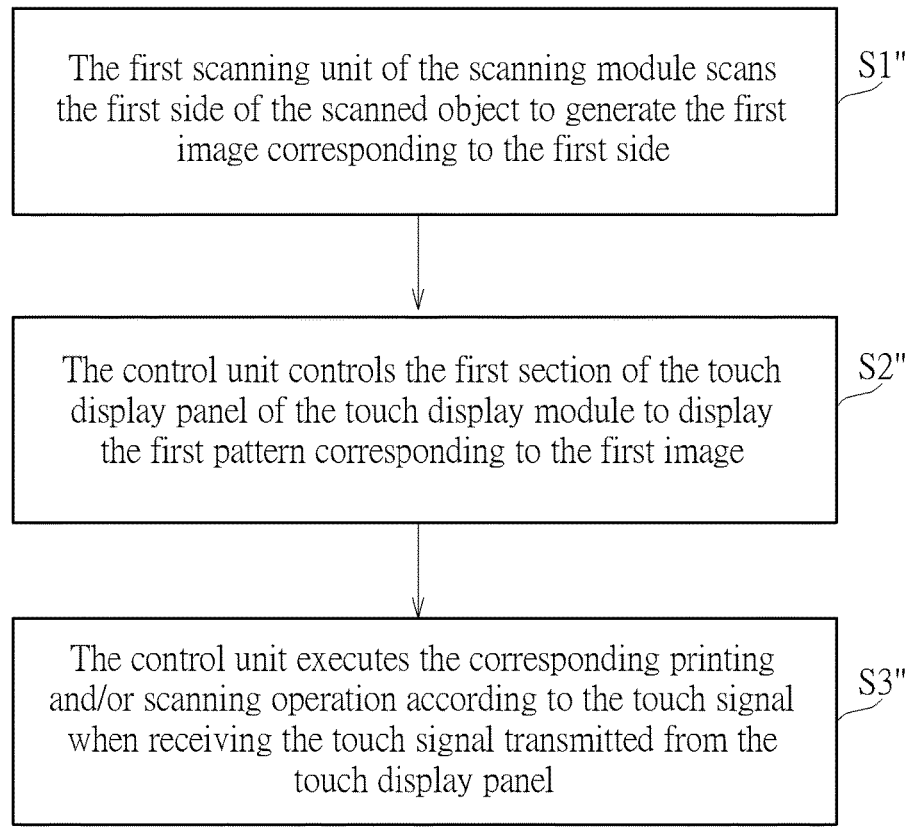
FIG. 11 is a flow chart diagram illustrating that an office apparatus executes a method of copying a scanned object according to a third embodiment of the present disclosure.
Figure 12:
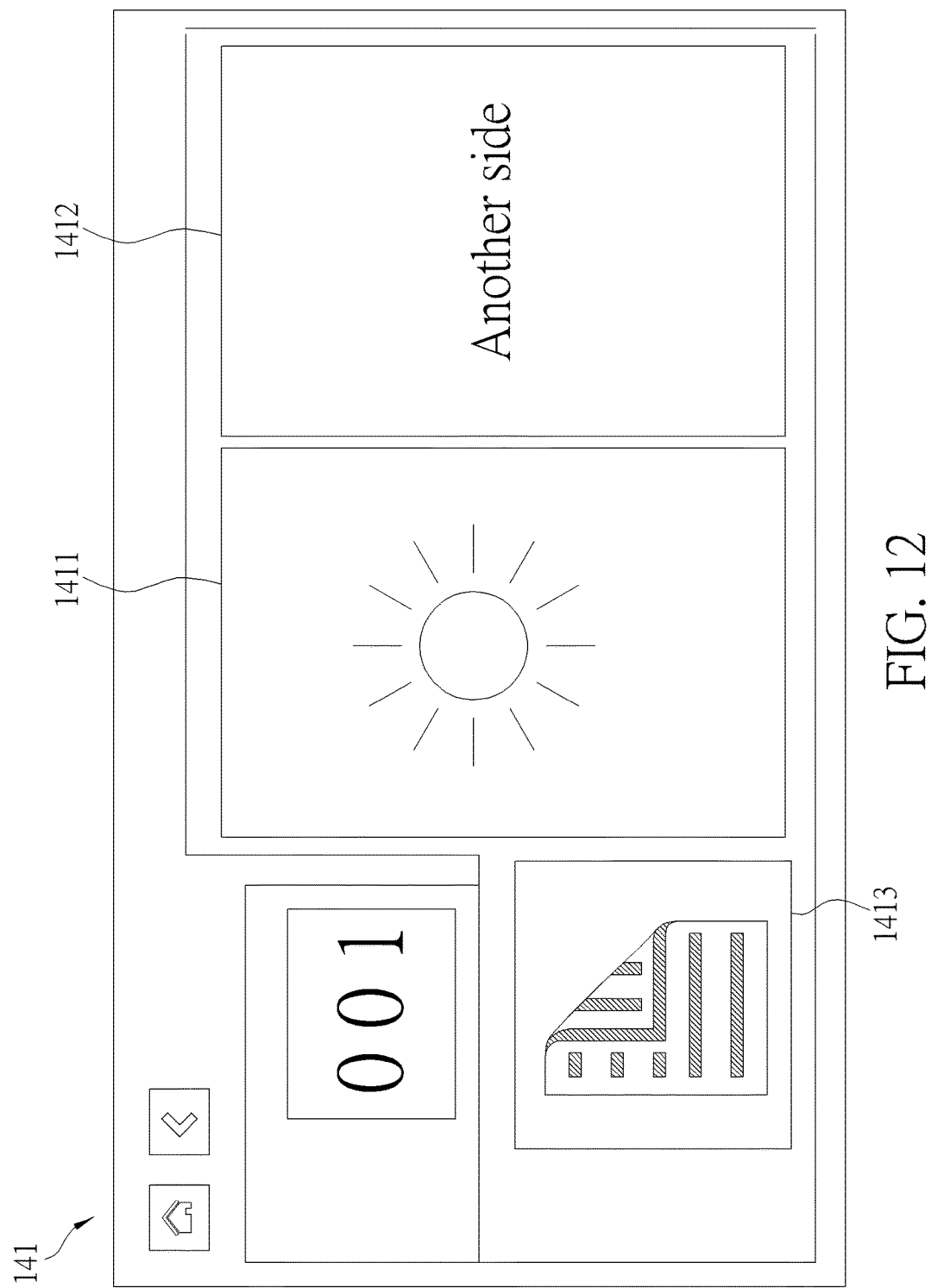
FIG. 12 is a diagram of a touch display panel according to the third embodiment of the present disclosure.

Besides, please refer to FIG. 11 and FIG. 12. FIG. 11 is a flow chart diagram illustrating that the office apparatus 1' executes a method of copying the scanned object S according to a third embodiment of the present disclosure. FIG. 12 is a diagram of the touch display panel 141 according to the third embodiment of the present disclosure. As shown in FIG. 11 and FIG. 12, different from the second embodiment, in order to save time and storage space of the storage unit 12, the first scanning unit 111 also can scan the first side of the scanned object S without scanning the second side of the scanned object S in the beginning. In other words, when the scanned object S is driven to pass through the first scanning unit 111 for the first time, the first scanning unit 111 can scan the first side of the scanned object S to generate the first image corresponding to the first side (step S1"). Afterwards, as shown in FIG. 11, the control unit 142 controls the first section 1411 of the touch display panel 141 to display the first pattern corresponding to the first image (step S2"). The first pattern can be a thumbnail of the first image. Furthermore, the control unit 142 further controls the second section 1412 and the third section 1413 of the touch display panel 141 to respectively display a default picture or pattern showing an alert message, such as the characters of "another side" as shown in FIG. 12, and the double-sided printing icon or even display nothing, rather than scanned images. When the control unit 142 receives the first touch signal transmitted from the first section 1411 of the touch display panel 141, the second touch signal transmitted from the second section 1412 of the touch display panel 141, or the third touch signal transmitted from the third section 1413 of the touch display panel 141, the control unit 142 can execute the corresponding printing or scanning operation according to the first touch signal, the second touch signal, or the third touch signal (step S3"). Specifically, when it is desired to copy the first side of the scanned object S only, the first section 1411 can be touched to generate the first touch signal, so that the control unit 142 can control the printing module 13 to print the first image corresponding to the first side of the scanned object S according to the first touch signal. When it is desired to copy the second side of the scanned object S only, the second section 1412 can be touched to generate the second touch signal. At this moment, since the second image has not been generated yet, the control unit 142 can control the driving assembly 152 of the automatic document feeding module 15 to drive the scanned object S to pass the first scanning unit 111 again and further control the first scanning unit 111 to scan the second side of the scanned object S to generate the second image corresponding to the second side according to the second touch signal. The second section 1412 can selectively display the second pattern corresponding to the second image or nothing. Afterwards, the control unit 142 further controls the printing module 13 to print the second image corresponding to the second side of the scanned object S. Alternatively, when it is desired to copy both of the first side and the second side of the scanned object S, the third section 1413 can be touched to generate the third touch signal. At this moment, since the second image has not been generated yet, the control unit 142 can control the driving assembly 152 of the automatic document feeding module 15 to drive the scanned object S to pass the first scanning unit 111 again and further control the first scanning unit 111 to scan the second side of the scanned object S to generate the second image corresponding to the second side according to the third touch signal. Afterwards, the control unit 142 further controls the printing module 13 to print the first image and the second image corresponding to the first side and the second side of the scanned object S onto the front surface and the rear surface of the printing media.

In contrast to the prior art, the present disclosure utilizes the control unit for at least controlling the first section of the touch display panel to display the first pattern corresponding to the first image according to the first image transmitted from the scanning module, so that it allows the user to confirm which image is going to be printed by previewing the first pattern. Furthermore, the present disclosure further utilizes the control unit for controlling the printing module to execute corresponding printing operation when receiving the touch signal transmitted from the touch display panel, so that it allows the user to copy at least one of the first side of the scanned object and the second side opposite to the first side of the scanned object. Therefore, the present disclosure can effectively prevent a blank printing page or a wrong printing page during copying operation, which saves time and resource.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A touch display module for controlling a printing module and a scanning module of an office apparatus to copy at least one of a first side of a scanned object and a second side opposite to the first side of the scanned object, the scanning module being for scanning the first side of the scanned object to generate a first image corresponding to the first side of the scanned object, the touch display module comprising:

a touch display panel electrically connected to the scanning module, the touch display panel comprising a first section for displaying a first pattern corresponding to the first image and generating a first touch signal; and a control unit electrically connected to the touch display panel, the printing module and the scanning module, the control unit controlling the first section of the touch display panel to display the first pattern corresponding to the first image according to the first image transmitted from the scanning module, and the control unit further controlling the printing module to print the first image according to the first touch signal when receiving the first touch signal transmitted from the first section.

2. The touch display module of claim 1, wherein the first pattern and the first image have different resolutions.

3. The touch display module of claim 1, wherein the touch display panel further comprises a second section for generating a second touch signal, the control unit further controls the scanning module to scan the second side of the scanned object opposite to the first side of the scanned object to generate a second image corresponding to the second side of the scanned object, and the control unit further controls the printing module to print the second image according to the second touch signal when receiving the second touch signal transmitted from the second section.

4. The touch display module of claim 1, wherein the touch display panel further comprises a third section for displaying a third pattern and generating a third touch signal, the control unit further controls the scanning module to scan the second side of the scanned object opposite to the first side of the scanned object to generate a second image corresponding to the second side of the scanned object and controls the printing module to print the first image and the second image onto a front surface and a rear surface opposite to the front surface of a printing media respectively according to the third touch signal when receiving the third touch signal transmitted from the third section.

5. The touch display module of claim 1, wherein the touch display module further comprises a second section, the scanning module further scans the second side of the scanned object opposite to the first side of the scanned object to generate a second image corresponding to the second side of the scanned object when or after the scanning module scans the first side of the scanned object to generate the first image corresponding to the first side of the scanned object, and the control unit further controls the first section and the second section of the touch display panel to display the first pattern corresponding to the first image and the second pattern corresponding to the second image respectively according to the first image and the second image transmitted from the scanning module.

6. The touch display module of claim 5, wherein the second section is for generating a second touch signal, and the control unit further controls the printing module to print the second image according to the second touch signal when receiving the second touch signal transmitted from the second section.

7. The touch display module of claim 5, wherein the touch display panel further comprises a third section for displaying a third pattern and generating a third touch signal, and the control unit further controls the printing module to print the first image and the second image onto a front surface and a rear surface opposite to the front surface of a printing media respectively according to the third touch signal when receiving the third touch signal transmitted from the third section.

8. The touch display module of claim 5, wherein the first pattern and the first image have different resolutions, and the second pattern and the second image have different resolutions.

9. An office apparatus for copying at least one of a first side and a second side opposite to the first side of a scanned object, the office apparatus comprising:
a scanning module comprising a first scanning unit for scanning the first side of the scanned object to generate a first image corresponding to the first side of the scanned object;
a storage unit for storing the first image;
a printing module for printing the first image; and
a touch display module comprising:
a touch display panel comprising a first section for displaying a first pattern corresponding to the first image and generating a first touch signal; and
a control unit electrically connected to the touch display panel, the scanning module, the storage unit and the printing module, the control unit controlling the first section of the touch display panel to display the first pattern corresponding to the first image according to the first image transmitted from the scanning module, and the control unit further controlling the printing module to print the first image according to the first touch signal when receiving the first touch signal transmitted from the first section.

10. The office apparatus of claim 9, wherein the first pattern and the first image have different resolutions.

11. The office apparatus of claim 9, wherein the touch display panel further comprises a second section for generating a second touch signal, the control unit further controls the first scanning unit to scan the second side of the scanned object opposite to the first side of the scanned object to generate a second image corresponding to the second side of the scanned object, and the control unit further controls the printing module to print the second image according to the second touch signal when receiving the second touch signal transmitted from the second section.

12. The office apparatus of claim 9, wherein the touch display panel further comprises a third section for displaying a third pattern and generating a third touch signal, the control unit further controls the first scanning unit to scan the second side of the scanned object opposite to the first side of the scanned object to generate a second image corresponding to the second side of the scanned object, and the control unit further controls the printing module to print the first image and the second image onto a front surface and a rear surface opposite to the front surface of a printing media respectively according to the third touch signal when receiving the third touch signal transmitted from the third section.

13. The office apparatus of claim 9, wherein the touch display module further comprises a second section, the first scanning unit further scans the second side of the scanned object opposite to the first side of the scanned object to generate a second image corresponding to the second side of the scanned object after the first scanning unit scans the first side of the scanned object to generate the first image corresponding to the first side of the scanned object, and the control unit further controls the first section and the second section of the touch display panel to display the first pattern corresponding to the first image and the second pattern corresponding to the second image respectively according to the first image and the second image transmitted from the scanning module.

14. The office apparatus of claim 13, wherein the second section is for generating a second touch signal, and the control unit further controls the printing module to print the second image according to the second touch signal when receiving the second touch signal transmitted from the second section.

15. The office apparatus of claim 13, wherein the touch display panel further comprises a third section for displaying a third pattern and generating a third touch signal, and the control unit further controls the printing module to print the first image and the second image onto a front surface and a rear surface opposite to the front surface of a printing media respectively according to the third touch signal when receiving the third touch signal transmitted from the third section.

16. The office apparatus of claim 13, wherein the first pattern and the first image have different resolutions, and the second pattern and the second image have different resolutions.

17. The office apparatus of claim 9, wherein the scanning module further comprises a second scanning unit for scanning the second side of the scanned object opposite to the first side of the scanned object to generate a second image corresponding to the second side of the scanned object, and the storage unit is for storing the second image.

18. The office apparatus of claim 17, wherein the touch display module further comprises a second section, the second scanning unit scans the second side of the scanned object to generate the second image corresponding to the second side of the scanned object when the first scanning unit scans the first side of the scanned object to generate the first image corresponding to the first side of the scanned object, and the control unit further controls the first section and the second section of the touch display panel to display the first pattern corresponding to the first image and the second pattern corresponding to the second image respectively according to the first image and the second image transmitted from the scanning module.

19. The office apparatus of claim 18, wherein the second section is for generating a second touch signal, and the control unit further controls the printing module to print the second image according to the second touch signal when receiving the second touch signal transmitted from the second section.

20. The office apparatus of claim 18, wherein the touch display panel further comprises a third section for displaying a third pattern and generating a third touch signal, and the control unit further controls the printing module to print the first image and the second image onto a front surface and a rear surface opposite to the front surface of a printing media respectively according to the third touch signal when receiving the third touch signal transmitted from the third section.

21. A method of copying at least one of a first side and a second side opposite to the first side of a scanned object, the method comprising:
   a scanning module scanning the first side of the scanned object to generate a first image;
   a control unit of a touch display module controlling a first section of a touch display panel of the touch display module to display a first pattern corresponding to the first image according to the first image transmitted from the scanning module; and
   the control unit controlling a printing module to print the first image according to a first touch signal when receiving the first touch signal transmitted from the first section.

22. The method of claim 21, further comprising:
   the control unit further controlling the scanning module to scan the second side of the scanned object to generate a second image corresponding to the second side of the scanned object and controlling the printing module to print the second image according to a second touch signal when receiving the second touch signal transmitted from a second section of the touch display panel.

23. The method of claim 21, further comprising:
   the control unit further controlling the scanning module to scan the second side of the scanned object to generate a second image corresponding to the second side of the scanned object and controlling the printing module to print the first image and the second image onto a front surface and a rear surface opposite to the front surface of a printing media respectively according to a third touch signal when receiving the third touch signal transmitted from a third section of the touch display panel.

24. The method of claim 21, further comprising:
   the scanning module further scanning the second side of the scanned object to generate a second image corresponding to the second side of the scanned object when or after the scanning module scans the first side of the scanned object to generate the first image corresponding to the first side of the scanned object; and
   the control unit further controlling the first section and a second section of the touch display panel to display the first pattern corresponding to the first image and a second pattern corresponding to the second image respectively according to the first image and the second image transmitted from the scanning module.

25. The method of claim 24, further comprising:
   the control unit further controlling the printing module to print the second image according to a second touch signal when receiving a second touch signal transmitted from the second section.

26. The method of claim 24, further comprising:
   the control unit further controlling the printing module to print the first image and the second image onto a front surface and a rear surface opposite to the front surface of a printing media respectively according to a third touch signal when receiving the third touch signal transmitted from a third section.

27. A method of copying a first scanned media and a second scanned media, the method comprising:
   a scanning module scanning a first side and a second side opposite to the first side of the first scanned media to generate a first image corresponding to the first side of the first scanned media and a second image corresponding to the second side of the first scanned media;
   the scanning module scanning a fourth side and a fifth side opposite to the fourth side of the second scanned media to generate a fourth image corresponding to the fourth side of the second scanned media and a fifth image corresponding to the fifth side of the second scanned media;
   a control unit of a touch display module controlling a first section, a second section and a third section of a touch display panel of the touch display module to display a first pattern corresponding to the first image, a second pattern corresponding to the second image and a third pattern respectively according to the first image and the second image transmitted from the scanning module;
   the control unit controlling a printing module to print the first image, the second image or both of the first image and the second image according to a first touch signal, a second touch signal or a third touch signal when receiving the first touch signal transmitted from the first section, the second touch signal transmitted from the second section or the third touch signal transmitted from the third section;
   the control unit controlling the first section, the second section and the third section to display a fourth pattern corresponding to the fourth image, a fifth pattern corresponding to the fifth image, and a sixth pattern respectively according to the fourth image and the fifth image after the control unit controls the printing module to print the first image, the second image or both of the first image and the second image; and
   the control unit controlling the printing module to print the fourth image, the fifth image or both of the fourth image and the fifth image according to a fourth touch signal, a fifth touch signal or a sixth touch signal when receiving the fourth touch signal transmitted from the first section, the fifth touch signal transmitted from the second section or the sixth touch signal transmitted from the third section.

* * * * *